US009935721B2

(12) United States Patent
Morimoto (10) Patent No.: US 9,935,721 B2
(45) Date of Patent: Apr. 3, 2018

(54) OPTICAL COMMUNICATION METHOD AND OPTICAL COMMUNICATION SYSTEM

(71) Applicant: FURUKAWA ELECTRIC CO., LTD., Tokyo (JP)

(72) Inventor: Masahito Morimoto, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/393,355

(22) Filed: Dec. 29, 2016

(65) Prior Publication Data

US 2017/0111121 A1   Apr. 20, 2017

Related U.S. Application Data

(63) Continuation of application No. PCT/JP2015/003018, filed on Jun. 17, 2015.

(30) Foreign Application Priority Data

Jul. 2, 2014   (JP) .................................. 2014-136718

(51) Int. Cl.
*H04B 10/00* (2013.01)
*H04B 10/85* (2013.01)
*H04B 10/70* (2013.01)
*H04B 10/532* (2013.01)

(52) U.S. Cl.
CPC ........... *H04B 10/85* (2013.01); *H04B 10/532* (2013.01); *H04B 10/70* (2013.01)

(58) Field of Classification Search
CPC .... H04B 10/70; H04B 10/532; H04B 10/112; H04B 10/1121; H04B 10/1123;
(Continued)

(56) References Cited

U.S. PATENT DOCUMENTS 6,314,189 B1* 11/2001 Motoyoshi ............. H04B 10/00
380/278
2005/0111665 A1* 5/2005 Ichimura ............... H04L 9/0855
380/256
(Continued)

FOREIGN PATENT DOCUMENTS

JP        2001-339387      12/2001
JP        2011-217344      10/2011
WO    WO 2005/112335 A1   11/2005

OTHER PUBLICATIONS

International Search Report dated Sep. 8, 2015 in PCT/JP2015/003018, filed on Jun. 17, 2015 ( with English Translation).
(Continued)

*Primary Examiner* — Hanh Phan
(74) *Attorney, Agent, or Firm* — Oblon, McClelland, Maier & Neustadt, L.L.P.

(57) ABSTRACT

The present invention provides an optical communication method and an optical communication system in which eavesdropping is more difficult than in conventional techniques. An optical communication system in one embodiment of the present invention comprises: a photon pair generator which generates a correlated photon pair; a polarizer which is provided on an optical path of one photon of the correlated photon pair and direction of which is changeable based on information to be transmitted; a shutter which is provided between the photon pair generator and the polarizer on the optical path of the one photon of the correlated photon pair and which is capable of blocking the one photon of the correlated photon pair; and a photon detector which is provided on an optical path of another photon of the correlated photon pair.

8 Claims, 5 Drawing Sheets

(58) Field of Classification Search
CPC .............. H04B 10/114; H04B 10/1141; H04B 10/1143; H04B 10/1149; H04L 9/12; H04L 9/0855
USPC ......... 398/140, 141, 152, 65, 158, 159, 182, 398/202, 212, 79, 136, 129, 131, 118, 398/119, 128, 130, 135, 138, 139; 380/278, 256, 255, 44, 277
See application file for complete search history.

(56) References Cited

U.S. PATENT DOCUMENTS

2007/0182968 A1    8/2007   Nishioka et al.
2010/0166187 A1    7/2010   Trifonov et al.

OTHER PUBLICATIONS

Written Opinion dated Sep. 8, 2015 in PCT/JP2015/003018, filed on Jun. 17, 2015.

Masahito Morimoto "Resolution of Single Photon and Electron Interference Enigma", viXra.org, e-print archive, 2013, 25 pages, URL: <http://rxiv.org/pdf/1312.0097v1.pdf>.

H. Takesue et al. "Differential phase shift quantum key distribution experiment over 105 km fibre", New Journal of Physics, vol. 7, 2005, 13 pages.

H. Goto et al. "Mechanism and development trends of quantum cryptography communication", Kinyu Kenkyu 2009, Institute for Monetary and Economic Studies, Bank of Japan, 43 pages.

Kyo Inoue "Quantum Key Distribution Technologies", IEEE Journal of Selected Topics in Quantum Electronics, vol. 12, No. 4, 2006, 9 pages.

* cited by examiner

OPTICAL COMMUNICATION METHOD AND OPTICAL COMMUNICATION SYSTEM

CROSS-REFERENCES TO RELATED APPLICATIONS

This application is a continuation application of International Application No. PCT/JP2015/003018, filed Jun. 17, 2015, which claims the benefit of Japanese Patent Application No. 2014-136718, filed Jul. 2, 2014. The contents of the aforementioned applications are incorporated herein by reference in their entireties.

TECHNICAL FIELD

The present invention relates to an optical communication method and an optical communication system for transmitting and receiving information by using photons.

BACKGROUND ART

In recent years, research and experiments have been made on quantum cryptography communication utilizing principles of quantum mechanics (Non Patent Documents 1 and 2). In the conventional quantum cryptography communication, studies have been made assuming that a photon in superposed states in the quantum mechanics exists in a communication path. When the photon in the superposed states is observed by an eavesdropper, the photon transitions from the superposed states to an eigenstate having definite information. Due to such an effect, the eavesdropper cannot perform eavesdropping without affecting the exchanged information, because the eavesdropper cannot reproduce the original superposed states. Hence, the fact that the proper sender and recipient can detect eavesdropping guarantees security.

For example, Non Patent Document 3 discloses an optical communication method for a quantum cryptography communication. In the optical communication method described in Non Patent Document 3, a sender phase-modulates a photon according to information desired to be transmitted and transmits the photon to a recipient. If an eavesdropper exists in a transmission pass and measures the photon, the eavesdropper may fail to retransmit a photon modulated by the same phase modulation because the eavesdropper cannot know the phase used by the sender. As a result, mismatch (error) between the information transmitted by the sender and the information received by the recipient increases and the existence of the eavesdropper can be thereby detected.

CITATION LIST

Non Patent Document

Non Patent Document 1: H. Takesue et al., "Differential phase shift quantum key distribution experiment over 105 km fibre", New Journal of Physics, 2005, Vol. 7, 232
Non Patent Document 2: H. Goto, "Mechanism and development trends of quantum cryptography communication", Kinyu Kenkyu, 2009, 28(3), pp. 107-150, Institute for Monetary and Economic Studies, Bank of Japan
Non Patent Document 3: K. Inoue, "Quantum Key Distribution Technologies", IEEE Journal of Selected Topics in Quantum Electronics, 2006, Vol. 12 (4), pp. 888-896
Non Patent Document 4: M. Morimoto, "Resolution of Single Photon and Electron Interference Enigma", http://vixra.org/abs/1312.0097, 2013

SUMMARY OF INVENTION

The conventional optical communication method described above even enables detection of the existence of the eavesdropper after the eavesdropping, but still allows the eavesdropper to measure the photon exchanged in the communication path. When the existence of the eavesdropper is detected, the conventional optical communication method can take a countermeasure against the eavesdropping, such as destroying information (for example, encryption key) on a photon which may have been maliciously measured. However, it is undeniable that the conventional optical communication method allows the photon to give some information to the eavesdropper. Accordingly, it is more preferable to make it more difficult for the eavesdropper to measure the photon from the beginning.

The present invention has been made in view of the problems described above, and an object thereof is to provide an optical communication method and an optical communication system in which eavesdropping is more difficult than in conventional techniques.

A first aspect of the present invention is an optical communication system comprising: a photon pair generator which generates a correlated photon pair; a polarizer which is provided on an optical path of one photon of the correlated photon pair and direction of which is changeable based on information to be transmitted; a shutter which is provided between the photon pair generator and the polarizer on the optical path of the one photon of the correlated photon pair and which is capable of blocking the one photon of the correlated photon pair; and a photon detector which is provided on an optical path of another photon of the correlated photon pair.

A second aspect of the present invention is an optical communication method comprising: setting a direction of a polarizer based on information to be transmitted; generating a correlated photon pair with a photon pair generator after the direction of the polarizer is set; blocking one photon of the correlated photon pair with a shutter after the correlated photon pair is generated; and detecting another photon of the correlated photon pair with a detector after the correlated photon pair is generated, wherein the shutter and the polarizer are arranged on an optical path of the one photon of the correlated photon pair, and the detector is arranged on an optical path of the another photon of the correlated photon pair.

In the optical communication method and the optical communication system of the present invention, since the information is transmitted based on the direction of the polarizer and the one photon of the correlated photon pair is blocked by the shutter, it is difficult to perform eavesdropping by reading the photon.

DESCRIPTION OF EMBODIMENTS

Embodiments of the present invention are described below with reference to the drawings. However, the present invention is not limited to the embodiments. Note that, in the drawings described below, parts with the same function are denoted by the same reference numeral and overlapping description thereof is omitted in some cases.

First Embodiment

Figure 1:
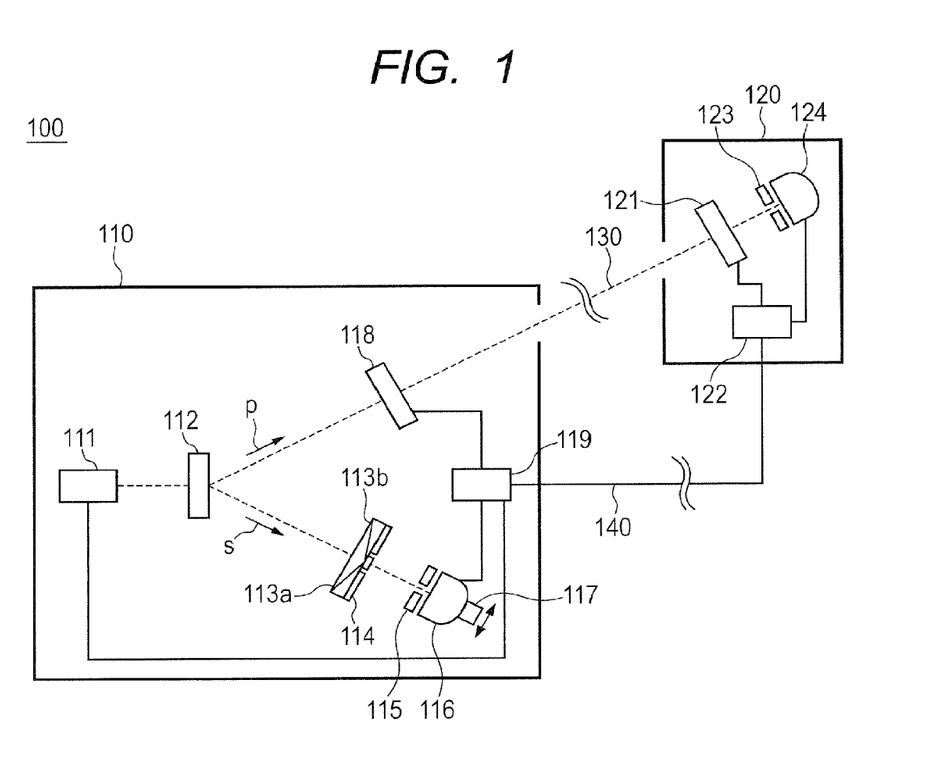
FIG. 1 is a schematic configuration diagram of an optical communication system in one embodiment of the present invention.

FIG. 1 is a schematic configuration diagram of an optical communication system 100 in the embodiment. The optical communication system 100 includes a receiver 110 and a transmitter 120, and the receiver 110 and the transmitter 120 are connected to each other by a communication path 130 which is a transmission path of information. Although the communication path 130 is a free space in the embodiment, the communication path 130 may at least partially be an optical waveguide such as an optical fiber or a PLC. Note that the names of the receiver 110 and the transmitter 120 are defined based on a direction in which the information is transmitted, and are opposite to a direction in which photons are transmitted as will be described later. Specifically, the transmission direction of the information is a direction from the transmitter 120 to the receiver 110, but the transmission direction of the photons is a direction from the receiver 110 to the transmitter 120.

In the receiver 110, there are provided a photon source 111 which outputs photons according to control of a reception controller 119 and a photon pair generator 112 which generates correlated photon pairs by receiving photons from the photon source 111. One photon of each photon pair is referred to as photon p, and the other photon is referred to as photon s. The photon p and the photon s are correlated to each other to have polarizations orthogonal to each other. Specifically, when the photon p is a vertically-polarized photon, the photon s is a horizontally-polarized photon or vise versa. In the embodiment, a BBO crystal ($\beta$-BaB$_2$O$_4$ crystal) which generates pairs of photons correlated to each other by means of parametric down-conversion is used as the photon pair generator 112. However, any material or device which generates pairs of photons correlated to each other can be used.

Two QWPs 113a and 113b (quarter wave plates) and a double slit plate 114 are provided corresponding to a direction in which the photons s are emitted by the photon pair generator 112, that is, are provided on an optical path of the photons s. The double slit plate 114 has two slits parallel to each other. The first QWP 113a is arranged such that the photons s having passed the first QWP 113a enter one of the two slits, and the second QWP 113b is arranged such that the photons s having passed the second QWP 113b enter the other one of the two slits.

When the linearly-polarized photons s enter the QWPs 113a and 113b at an angle of −45° or 45° with respect to the fast axes of the QWPs 113a and 113b (the polarization of the photons s in this case is assumed to be diagonal polarization), the QWPs 113a and 113b convert the photons s to a circularly-polarized photons and output the converted photons s. Meanwhile, when the linearly-polarized photons s enter the QWPs 113a and 113b at an angle of 0° or 90° with respect to the fast axes of the QWPs 113a and 113b (the polarization of the photons s in this case is assumed to be vertical polarization or horizontal polarization), the QWPs 113a and 113b output the photons s as they are as linearly-polarized photons. Moreover, the directions in which the respective QWPs 113a and 113b convert the photons s to circularly-polarized photons are opposite to each other. Specifically, the first QWP 113a converts the photons s to right circularly-polarized photons while the second QWP 113b converts the photons s to left circularly-polarized photons (or vise versa). In such a configuration, when the vertically-polarized or horizontally-polarized photons s enter the QWPs 113a and 113b, interference occurs after the photons s pass through the double slit plate 114. Meanwhile, when the diagonally-polarized photons s enter the QWPs 113a and 113b, no interference occurs after the photons s pass through the double slit plate 114.

A slit plate 115 and a reception detector 116 are provided on a path of the photons s having passed the double slit plate 114, that is, are provided on the optical path of the photons s. The slit plate 115 has a slit which allows the photons s to enter the reception detector 116 only in a predetermined direction.

The reception detector 116 outputs a predetermined signal to the reception controller 119 upon detecting the photons s. Although an APD (avalanche photodiode) is used as the reception detector 116 in the embodiment, any device capable of detecting photons can be used. A driver 117 which moves the reception detector 116 in a direction perpendicular to the direction in which the photons s are emitted by the photon pair generator 112 (optical path of the photons s) is connected to the reception detector 116. The driver 117 is any driver such as a motor or an actuator. By repeating the detection of the photons s while moving the reception detector 116 with the driver 117, the number of photons s detected by the reception detector 116 at each position can be obtained.

A shutter 118 is provided corresponding to a direction in which the photons p are emitted by the photon pair generator 112, that is, is provided on an optical path of the photons p. The shutter 118 is switchable between an open state in which the photons p are allowed to pass and travel toward the communication path 130 and a closed state in which the photons p are blocked and prevented from traveling toward the communication path 130, according to the control of the reception controller 119. Any device which can be mechanically or electromagnetically switched between the open state and the closed state can be used as the shutter 118.

The reception controller 119 is connected to the photon source 111, the reception detector 116, and the shutter 118. The reception controller 119 electrically controls the members, communicates with the transmitter 120 via a synchronization transmission path 140, records measured data, and performs input and output for the user. The reception controller 119 includes any computer or electric circuit.

In the transmitter 120, a polarizer 121 (polarization plate) is provided corresponding to the direction in which the photons p from the receiver 110 enter, that is, is provided on the optical path of the photons p. The polarizer 121 is switchable between a first state in which the polarizer 121 allows photons having polarization in a predetermined direction to completely pass and a second state in which the direction to allow the photons to pass is rotated by +45° or −45° from that of the first state. In the embodiment, since the vertical polarization or the horizontal polarization is used as the polarization in the predetermined direction, the polarizer 121 in the first state allows the vertically-polarized or horizontally-polarized photons to pass while the polarizer 121 in the second state allows the diagonally-polarized photons to pass. The polarizer 121 is switchable between the first state and the second state according to the control by a transmission controller 122.

A slit plate 123 and a transmission detector 124 are provided on a path of the photons p having passed the polarizer 121. The slit plate 123 has a slit which allows the photons p to enter the transmission detector 124 only in a predetermined direction. The transmission detector 124 outputs a predetermined signal to the transmission controller 122 upon detecting the photons p. Note that, in the embodiment, since the information is transmitted from the transmitter 120 to the receiver 110 based on the direction of the polarizer 121 as will be described below, the transmission detector 124 is not necessarily required for the information transmission. The transmission detector 124 is used to align the optical axis of the communication path 130 between the transmitter 120 and the receiver 110 or to measure the distance between the transmitter 120 and the receiver 110 by receiving photons from the receiver 110.

The transmission controller 122 is connected to the polarizer 121 and the transmission detector 124. The transmission controller 122 electrically controls the members, communicates with the receiver 110 via the synchronization transmission path 140, records measured data, and performs input and output for the user. The transmission controller 122 includes any computer or electric circuit.

The receiver 110 and the transmitter 120 are connected to each other by the synchronization transmission path 140. The synchronization transmission path 140 may be any communication path such as an optical fiber communication path, a radio communication path, and the like. The transmission controller 122 transmits a synchronization signal to the reception controller 119 via the synchronization transmission path 140 to perform transmission-reception timing synchronization. The transmission-reception timing synchronization is performed by means of any synchronization method by using a signal indicating a transmission time, a periodic signal, and the like.

Principles of the present invention are described. It has been conventionally considered that: in a correlated photon pair (entangled photon pair) generated by a BBO crystal (photon pair generator), when one photon s has the vertical polarization $|y\rangle$, the other photon p has the horizontal polarization $|x\rangle$ or vise versa; and these polarization directions are not determined until the photons are observed and the photons are in the superposed states. Specifically, it has been considered that the correlated photon pair is in a superposition of a state $|y\rangle_s|x\rangle_p$ in which the photon s has the vertical polarization $|y\rangle$ and the photon p has the horizontal polarization $|x\rangle$ and a state $|x\rangle_s|y\rangle_p$ in which the photon s has the horizontal polarization $|x\rangle$ and the photon p has the vertical polarization $|y\rangle$. This state is expressed by formula (1).

[Math 1]

$$|\Psi\rangle = \frac{1}{\sqrt{2}}(|x\rangle_s|y\rangle_p + |y\rangle_s|x\rangle_p) \qquad (1)$$

However, in this concept, a paradox in which time seems to be reversed occurs and a special situation such as a situation in which cause and effect are switched occurs. Meanwhile, explanation can be made without using the conventional concept by accepting existence of a non-localized potential as described below.

Specifically, the horizontal polarization $|x\rangle$ and the vertical polarization $|y\rangle$ of the photons having passed a device, which allows only specific polarization to pass, such as the polarizer have been conventionally considered to be in a superposition of polarization rotated by +45° or −45° as expressed by formula (2).

[Math 2]

$$|x\rangle = \frac{1}{\sqrt{2}}|+\rangle + \frac{1}{\sqrt{2}}|-\rangle \qquad (2)$$

$$|y\rangle = \frac{1}{\sqrt{2}}|+\rangle - \frac{1}{\sqrt{2}}|-\rangle$$

In this formula, $|+\rangle$ represents polarization of +45° with respect to the x axis, and $|-\rangle$ represents polarization of −45° with respect to the x axis. Although this is correct in a classical electromagnetic field, applying this expression to a photon which cannot be divided such as a single photon leads to paradox. In the case of dealing with a very small number of photons as described above, such a situation can be explained well by using the non-localized potential which universally exists in a space, instead of considering such a situation as superposition. In this case, formula (3) in which a non-localized potential $|\zeta\rangle$ is added to formula (2) needs to be considered as a correct expression.

[Math 3]

$$|x\rangle \rightarrow |x\rangle + |\zeta_1\rangle = \frac{1}{\sqrt{2}}|+\rangle + \frac{1}{\sqrt{2}}|-\rangle \qquad (3)$$

$$|y\rangle \rightarrow |y\rangle + |\zeta_2\rangle = \frac{1}{\sqrt{2}}|+\rangle - \frac{1}{\sqrt{2}}|-\rangle$$

Therefore, the non-localized potential $|\zeta\rangle$ is expressed by formula (4).

[Math 4]

$$|\zeta_1\rangle = \frac{1}{\sqrt{2}}|+\rangle + \frac{1}{\sqrt{2}}|-\rangle - |x\rangle \qquad (4)$$

$$|\zeta_2\rangle = \frac{1}{\sqrt{2}}|+\rangle - \frac{1}{\sqrt{2}}|-\rangle - |y\rangle$$

In this formula, the letters attached to the non-localized potential $|\zeta\rangle$ each represent the direction of the polarizer (polarizer 121 in the optical communication system 100), $|\zeta_1\rangle$ represents the horizontal direction, and $|\zeta_2\rangle$ represents the vertical direction. As described above, the direction of the non-localized potential $|\zeta\rangle$ is determined by the existence of the polarizer. Specifically, the non-localized potential is $|\zeta_1\rangle$ when the direction of the polarizer is horizontal and the non-localized potential is $|\zeta_2\rangle$ when the direction of the polarizer is vertical.

Since the non-localized potential $|\zeta\rangle$ follows the Maxwell's equations, the non-localized potential $|\zeta\rangle$ propagates from the polarizer at the speed of light. When the propagated non-localized potential $|\zeta\rangle$ reaches the BBO crystal (photon pair generator 112 in the optical communication system 100) which generates the photon pairs, the polarization of the photons which can be generated by the BBO crystal is determined by this non-localized potential |ζ⟩ whose direction is determined.

Specifically, before the BBO crystal generates photons, the non-localized potential |ζ⟩ reaches the BBO crystal from the polarizer existing in the direction in which the photons are to be emitted from the BBO crystal. When the direction of the polarizer is horizontal, the non-localized potential |ζ$_1$⟩ reaches the BBO crystal. Accordingly, the BBO crystal can generate only the photons p having the horizontal polarization |x⟩ in the direction toward the polarizer. In this case, the other photons s of the correlated photon pairs have the vertical polarization |y⟩. Meanwhile, when the direction of the polarizer is vertical, the non-localized potential |ζ$_2$⟩ reaches the BBO crystal. Accordingly, the BBO crystal can generate only the photons p having the vertical polarization |y⟩ in the direction toward the polarizer. In this case, the other photons s of the correlated photon pairs have the horizontal polarization |x⟩. As described above, the polarization of the photons which can be generated by the BBO crystal is restricted by the direction of the polarizer existing in the direction in which the photons are to be emitted from the BBO crystal. Note that, although description is given of the vertical polarization and the horizontal polarization, the polarization of the photons which can be generated by the BBO crystal is restricted by the direction of the polarizer in a similar way also in the diagonal polarization rotated by +45° or −45° from the vertical polarization or the horizontal polarization.

In other words, in the BBO crystal, the completely-correlated photon pair is generated from the beginning, and the correlated photon pair before being observed is not in the superposed states as in the conventional concept. However, since the non-localized potential itself cannot be observed and such determination of the direction cannot therefore be sensed, it has been conventionally considered that there is a strange correlation in the photon pairs.

Since probability amplitudes of the non-localized potential are ⟨ζ$_1$|ζ$_1$⟩=0 and ⟨ζ$_2$|ζ$_2$⟩=0, it can be seen that the non-localized potential cannot be observed. This can be easily derived by multiplying formula (4) as it is and by using the relationship of formula (5).

$$1/\sqrt{2} = \langle x|+\rangle = \langle +|x\rangle = \langle y|+\rangle = \langle +|y\rangle$$
$$= \langle x|-\rangle = \langle -|x\rangle = -\langle y|-\rangle = -\langle -|y\rangle \quad (5)$$

In summary, the correlated photon pair generated by the BBO crystal has the complete correlation in which, when one photon has the vertical polarization |y⟩, the other photon has the horizontal polarization |x⟩ (or vise versa). However, these directions of polarization are determined when the photon pair is generated, irrespective of whether the observation is performed or not, and the correlated photon pair is not in the superposed states as in the conventional concept. The non-localized potential |ζ⟩ whose direction is determined determines the directions of polarization upon reaching the BBO crystal before the generation of the photon pairs.

Figure 2:
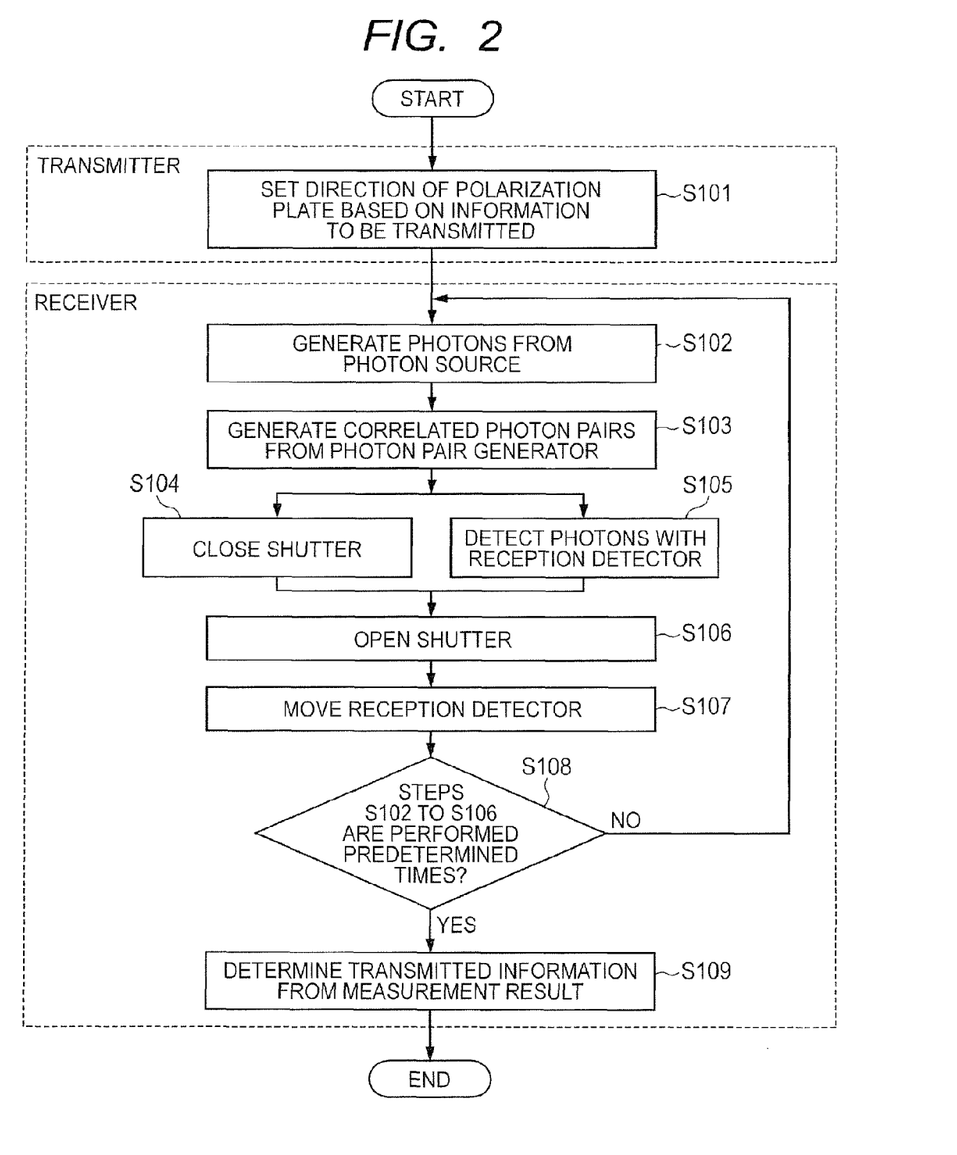
FIG. 2 is a view depicting a flowchart of an optical communication method in one embodiment of the present invention.

FIG. 2 is a view depicting a flowchart of an optical communication method using the optical communication system 100. First, in the state where the shutter 118 is open, the transmission controller 122 sets the direction of the polarizer 121 based on the information to be transmitted (step S101). In the embodiment, in the case of transmitting "1" as first information, the polarizer 121 is set to the first state in which the vertically-polarized or horizontally-polarized photons are allowed to completely pass. Meanwhile, in the case of transmitting "0" as second information, the polarizer 121 is set to the second state in which the direction to allow the photons to pass is rotated by +45° or −45° from that of the first state. The direction of polarization allowed to pass in the first state may be set to a direction other than the horizontal polarization or the vertical polarization. Moreover, "0" and "1" which are the information to be transmitted may be opposite. In such a case, the receiver 110 may be configured such that definitions of relationships between the directions of polarization and the information to be transmitted are appropriately changed.

Next, the reception controller 119 generates photons from the photon source 111 (step S102). A timing at which the photons are generated from the photon source 111 is set such that the photons from the photon source 111 reaches the photon pair generator 112 after the non-localized potential from the polarizer 121 reaches the photon pair generator 112. Specifically, assume that a time point at which the direction of the polarizer 121 is set is $t_1$, a time required for the non-localized potential from the polarizer 121 to reach the photon pair generator 112 is a, and a time required for the photons from the photon source 111 to reach the photon pair generator 112 is b. In this case, a time point $t_2$ at which the photons are generated from the photon source 111 is expressed by formula (6).

[Math 6]

$$t_2 > t_1 + a - b \quad (6)$$

Since the non-localized potential and the photons travel at the speed of light, the times a and b can be calculated from the distances between the members. The time point $t_1$ at which the direction of the polarizer 121 is set is determined based on the synchronization signal received from the transmission controller 122 via the synchronization transmission path 140.

Upon receiving the photons from the photon source 111, the photon pair generator 112 generates the photons p and s which are the correlated photon pairs (step S103). At this point, since the non-localized potential from the polarizer 121 has already reached the photon pair generator 112, the polarization directions of the photons p and s are determined by the non-localized potential. Specifically, when the polarizer 121 is in the first state in which the vertically-polarized or horizontally-polarized photons are allowed to completely pass, the photons p traveling from the photon pair generator 112 toward the polarizer 121 are the vertically-polarized or horizontally-polarized photons, and the other photons s are also the vertically-polarized or horizontally-polarized photons. Meanwhile, when the polarizer 121 is in the second state in which the direction to allow the photons to pass is rotated by +45° or −45° from that of the first state and the diagonally-polarized photons are allowed to pass, the photons p traveling from the photon pair generator 112 toward the polarizer 121 are the diagonally-polarized photons and the other photons s are also the diagonally-polarized photons.

Next, the reception controller 119 closes the shutter 118 (step S104). A timing at which the shutter 118 is closed is a timing after the photons p and s are generated in the photon pair generator 112 and before the photons p reach the shutter 118. Specifically, assume that a time required to generate the photons p and s in the photon pair generator 112 is c and a time required for the photons p from the photon pair generator 112 to reach the shutter 118 is d. In this case, a time point $t_3$ at which the shutter 118 is closed is expressed by formula (7). Since the photons travel at the speed of light, the times c and d can be calculated from the distances between the members.

[Math 7]

$$t_2+b+c<t_3<t_2+b+c+d \tag{7}$$

In parallel with step S104, the reception detector 116 detects the photons s having passed through the QWPs 113a and 113b and the double slit plate 114 and records whether the photons s are detected or not in the reception controller 119 (step S105). Thereafter, the reception controller 119 opens the shutter 118 (step S106).

In the embodiment, in order to determine the transmitted information (direction of the polarizer 121) from whether interference occurs or not in a measurement result, the detection needs to be performed at multiple measurement positions and performed multiple times at each measurement position. To achieve this, the driver 117 moves the reception detector 116 by a predetermined distance (step S107) and steps S102 to S106 are repeated predetermined times at each measurement position (step S108), without the direction of the polarizer 121 being changed. For example, steps S102 to S107 are performed 50 times at each of 20 positions (total of 1000 times).

Lastly, the reception controller 119 determines the transmitted information by plotting a photon detection number measured at each measurement position (step S109). Specifically, when the occurrence of interference is recognized in the plot, the photons s before entering the QWPs 113a and 113b are the vertically-polarized or horizontally-polarized photons, and the other photons p are therefore also the vertically-polarized or horizontally-polarized photons. From this, it is found that the polarizer 121 on the optical path of the photons p is in the first state in which the vertically-polarized or horizontally-polarized photons are allowed to completely pass. Hence, the reception controller 119 determines that the information transmitted from the transmitter 120 is "1" which is the first information. Meanwhile, when no occurrence of interference is recognized in the plot, the photons s before entering the QWPs 113a and 113b are the diagonally-polarized photons, and the other photons p are therefore also the diagonally-polarized photons. From this, it is found that the polarizer 121 on the optical path of the photons p is in the second state in which the direction to allow the photons to pass is rotated by +45° or −45° from that of the first state. Hence, the reception controller 119 determines that the information transmitted from the transmitter 120 is "0" which is the second information.

Figure 3A:
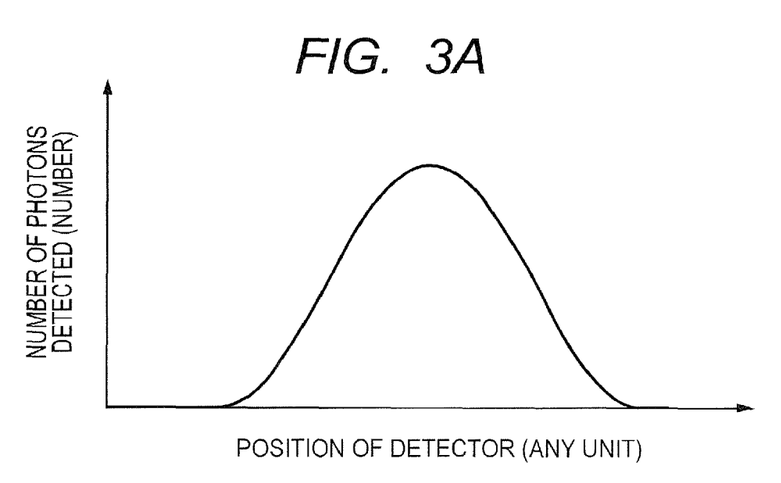
FIG. 3A is a view depicting a schematic plot of a result measured by the optical communication method in one embodiment of the present invention.
Figure 3B:
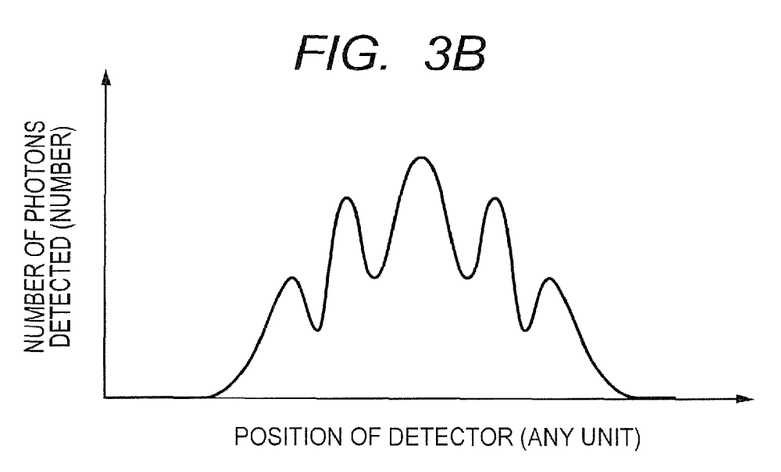
FIG. 3B is a view depicting a schematic plot of a result measured by the optical communication method in one embodiment of the present invention.

FIGS. 3A and 3B are views depicting schematic plots of results measured by the reception detector 116. When the plot has a mountain shape with one peak as illustrated in FIG. 3A, no interference is occurring. Accordingly, the photons s before entering the QWPs 113a and 113b are the diagonally-polarized photons. Meanwhile, when the plot has a wave shape with multiple peaks as illustrated in FIG. 3B, interference is occurring. Accordingly, the photons s before entering the QWPs 113a and 113b are the vertically-polarized or horizontally-polarized photons. Such determination can be performed by the reception controller 119 or by the user.

In the optical communication system 100 of the embodiment, the information is transmitted by utilizing the fact that the non-localized potential which cannot be observed is sent from the transmitter 120 to the receiver 110 and the polarization of the photons which can be generated in the photon pair generator 112 is restricted by the non-localized potential. Although the receiver 110 and the transmitter 120 of the optical communication system 100 are arranged at positions capable of transmitting and receiving the photons, the shutter 118 blocks the photons before the photons are actually emitted from the receiver 110 to the transmitter 120. Accordingly, an eavesdropper cannot intercept the exchanged photons and read information. Moreover, since no observable photons travel through the transmission path of the information from the transmitter 120 to the receiver 110, it is difficult for the eavesdropper to know the transmission path.

Second Embodiment

In the optical communication system 100 of the first embodiment, the information is statistically determined by utilizing the existence or absence of interference. Accordingly, transmission needs to be performed multiple times for one piece of information ("1" or "0"). Meanwhile, in the embodiment, information can be determined by performing transmission once for one piece of information.

Figure 4:
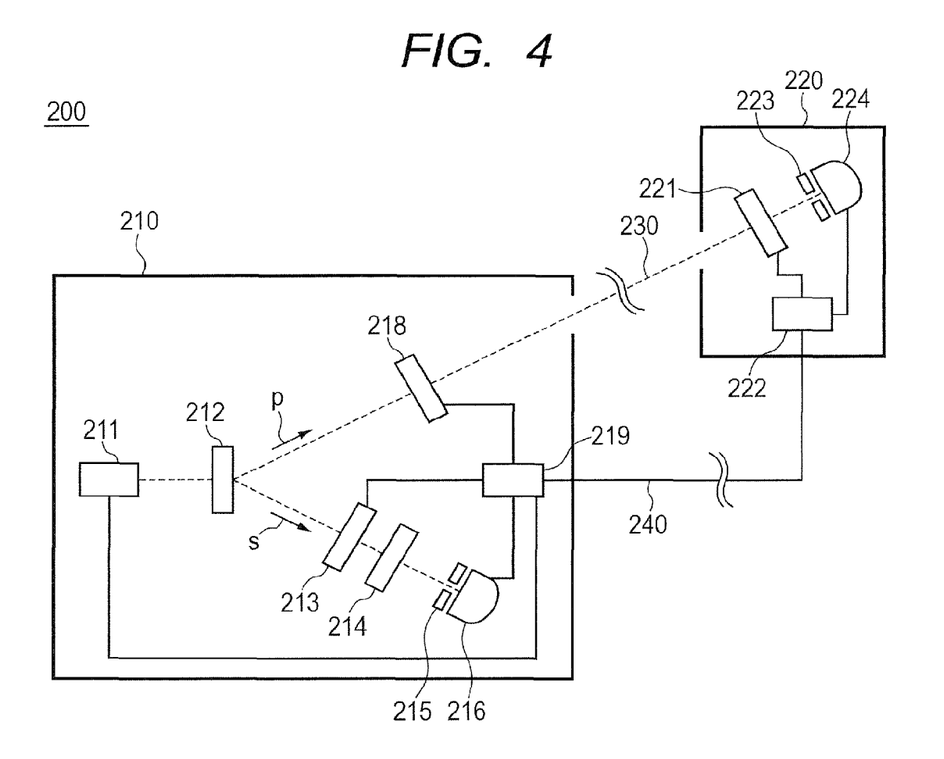
FIG. 4 is a schematic configuration diagram of an optical communication system in one embodiment of the present invention.

FIG. 4 is a schematic configuration diagram of an optical communication system 200 of the embodiment. The optical communication system 200 includes a receiver 210 and a transmitter 220, and the receiver 210 and the transmitter 220 are connected to each other by a communication path 230 which is a transmission path of information. Although the communication path 230 is a free space in the embodiment, the communication path 230 may at least partially be an optical waveguide such as an optical fiber or a PLC.

In the receiver 210, there are provided a photon source 211 which outputs photons according to control of a reception controller 219 and a photon pair generator 212 which generates correlated photon pairs by receiving photons from the photon source 211. One photon of each photon pair is referred to as photon p, and the other photon is referred to as photon s. The photon p and the photon s are correlated to each other to have polarizations orthogonal to each other. Specifically, when the photon p is a vertically-polarized photon, the photon s is a horizontally-polarized photon or vise versa. In the embodiment, a BBO crystal (β-BaB$_2$O$_4$ crystal) which generates pairs of photons correlated to each other by means of photometric down-conversion is used as the photon pair generator 212. However, any material or device which generates pairs of photons correlated to each other can be used.

A second shutter 213 and a second polarizer 214 (polarization plate) are provided corresponding to a direction in which the photons s are emitted by the photon pair generator 212, that is, are provided on an optical path of the photons s. The second shutter 213 is switchable between an open state in which the photons s are allowed to pass and travel toward the second polarizer 214 and a closed state in which the photons s are blocked and prevented from traveling toward the second polarizer 214, according to the control of the reception controller 219. Any device which can be mechanically or electromagnetically switched between the open state and the closed state can be used as the second shutter 213.

The second polarizer 214 allows photons having polarization of a predetermined direction to pass and does not allow photons having polarization of directions other than the predetermined direction to pass. In the embodiment, since the horizontal polarization is used as the polarization of the predetermined direction, the second polarizer 214 allows the photons s to pass when the photons s are horizontally-polarized and does not allow photons s to pass when the photons s are polarized in other directions, that is, vertically-polarized or diagonally-polarized.

A slit plate 215 and a reception detector 216 are provided on a path of the photons s having passed the second polarizer 214. The slit plate 215 has a slit which allows the photons s enter the reception detector 216 only in a predetermined direction.

The reception detector 216 outputs a predetermined signal to the reception controller 219 upon detecting the photons s. Although an APD (avalanche photodiode) is used as the reception detector 216 in the embodiment, any device capable of detecting photons can be used.

A first shutter 218 is provided corresponding to a direction in which the photons p are emitted by the photon pair generator 212, that is, is provided on an optical path of the photons p. The first shutter 218 is switchable between an open state in which the photons p are allowed to pass and travel toward the communication path 230 and a closed state in which the photons p are blocked and prevented from traveling toward the communication path 230, according to the control of the reception controller 219. Any device which can be mechanically or electromagnetically switched between the open state and the closed state can be used as the first shutter 218.

The reception controller 219 is connected to the photon source 211, the reception detector 216, the first shutter 218, and the second shutter 213. The reception controller 219 electrically controls the members, communicates with the transmitter 220 via a synchronization transmission path 240, records measured data, and performs input and output for the user. The reception controller 219 includes any computer or electric circuit.

In the transmitter 220, a first polarizer 221 (polarization plate) is provided corresponding to the direction in which the photons p from the receiver 210 enter, that is, is provided on the optical path of the photons p. The first polarizer 221 is switchable between a first state in which the first polarizer 221 allows photons having polarization in a predetermined direction to completely pass and a second state in which the direction to allow the photons to pass is rotated by a predetermined angle (for example, +90° or −90°) from that of the first state. In the embodiment, since the vertical polarization is used as the polarization in the predetermined direction, the polarizer 221 in the first state allows the vertically-polarized photons to pass while the polarizer 221 in the second state allows the horizontally-polarized photons to pass. The first polarizer 221 is switchable between the first state and the second state according to the control by a transmission controller 222.

A slit plate 223 and a transmission detector 224 are provided on a path of the photons p having passed the first polarizer 221. The slit plate 223 has a slit which allows the photons p to enter the transmission detector 224 only in a predetermined direction. The transmission detector 224 outputs a predetermined signal to the transmission controller 222 upon detecting the photons p. Note that, in the embodiment, since the information is transmitted from the transmitter 220 to the receiver 210 based on the direction of the first polarizer 221 as in the first embodiment, the transmission detector 224 is not necessarily required for the information transmission. The transmission detector 224 is used to align the optical axis of the communication path 230 between the transmitter 220 and the receiver 210 or to measure the distance between the transmitter 220 and the receiver 210 by receiving photons from the receiver 210.

The transmission controller 222 is connected to the first polarizer 221 and the transmission detector 224. The transmission controller 222 electrically controls the members, communicates with the receiver 210 via the synchronization transmission path 240, records measured data, and performs input and output for the user. The transmission controller 222 includes any computer or electric circuit.

The receiver 210 and the transmitter 220 are connected to each other by the synchronization transmission path 240. The synchronization transmission path 240 may be any communication path such as an optical fiber communication path, a radio communication path, and the like. The transmission controller 222 transmits a synchronization signal to the reception controller 219 via the synchronization transmission path 240 to perform transmission-reception timing synchronization. The transmission-reception timing synchronization is performed by means of any synchronization method by using a signal indicating a transmission time, a periodic signal, and the like.

Figure 5:
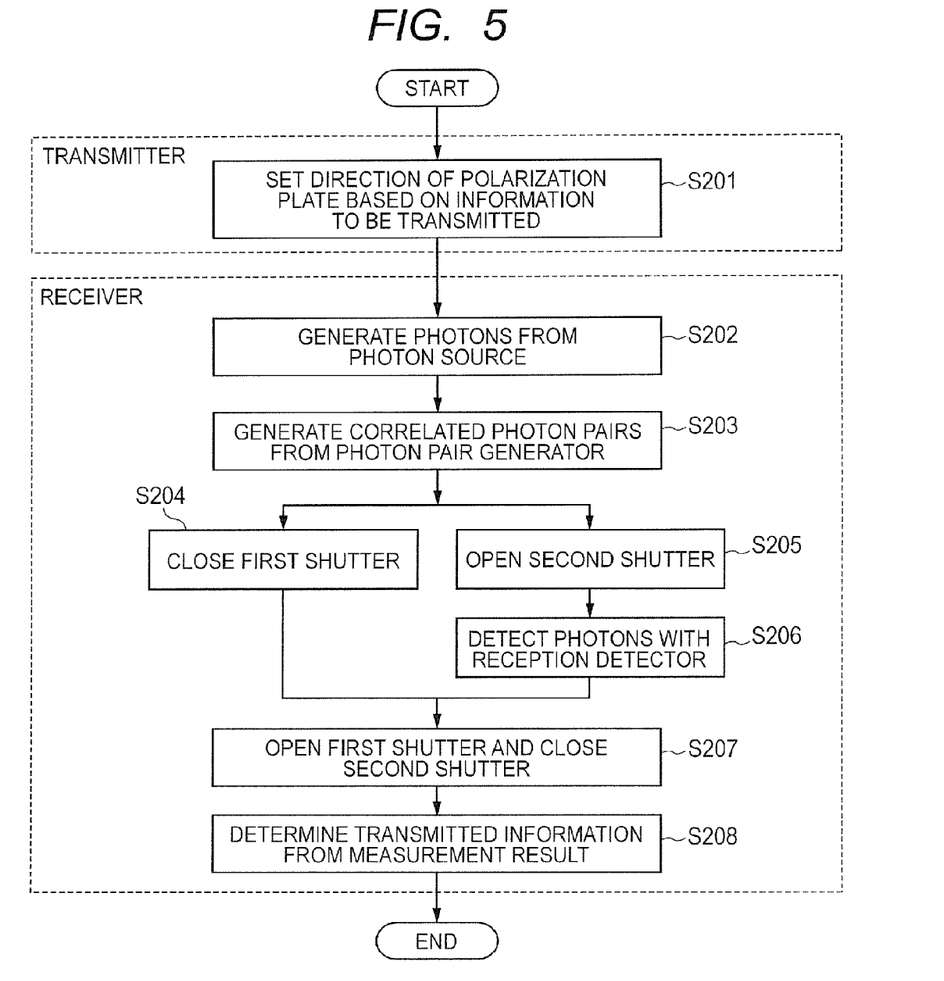
FIG. 5 is a view depicting a flowchart of an optical communication method in one embodiment of the present invention.

FIG. 5 is a view depicting a flowchart of an optical communication method using the optical communication system 200. First, in the state where the second shutter 213 is closed and the first shutter 218 is open, the transmission controller 222 sets the direction of the first polarizer 221 based on the information to be transmitted (step S201). In the embodiment, in the case of transmitting "1" as first information, the first polarizer 221 is set to the first state in which the vertically-polarized photons are allowed to completely pass. Meanwhile, in the case of transmitting "0" as second information, the first polarizer 221 is set to the second state in which the direction to allow the photons to pass is rotated by the predetermined angle (for example, +90° or −90°) from that of the first state. The direction of polarization allowed to pass in the first state may be set to a direction other than the vertical polarization. Moreover, "0" and "1" which are the information to be transmitted may be opposite. In such cases, the receiver 210 may be configured such that definitions of relationships between the directions of polarization and the information to be transmitted are appropriately changed.

Next, the reception controller 219 generates photons from the photon source 211 (step S202). A timing at which the photons are generated from the photon source 211 is set such that the photons from the photon source 211 reaches the photon pair generator 212 after the non-localized potential from the first polarizer 221 reaches the photon pair generator 212. This timing can be calculated by using formula (6) as in the first embodiment.

Upon receiving the photons from the photon source 211, the photon pair generator 212 generates the photons p and s which are the correlated photon pairs (step S203). At this point, since the non-localized potential from the first polarizer 221 has already reached the photon pair generator 212, the polarization directions of the photons p and s are determined by the non-localized potential. Specifically, when the first polarizer 221 is in the first state in which the vertically-polarized photons are allowed to completely pass, the photons p traveling from the photon pair generator 212 toward the first polarizer 221 are the vertically-polarized photons, and the other photons s are the horizontally-polarized photons. Meanwhile, when the first polarizer 221 is in the second state in which the direction to allow the photons to pass is rotated by the predetermined angle (+90° or −90° in this case) from that of the first state and the horizontally-polarized photons are allowed to pass, the photons p traveling from the photon pair generator 212 toward the first polarizer 221 are the horizontally-polarized photons and the other photons s are the vertically-polarized photons.

Next, the reception controller 219 closes the first shutter 218 (step S204). A timing at which the first shutter 218 is closed is a timing after the photons p and s are generated in the photon pair generator 212 and before the photons p reach the first shutter 218. This timing can be calculated by using formula (7) as in the first embodiment.

In parallel with step S204, the reception controller 219 opens the second shutter 213 (step S205). A timing at which the second shutter 213 is opened is a timing after the photons p and s are generated in the photon pair generator 212 and before the photons s reach the second shutter 213. Specifically, assume that a time required for the photons s from the photon pair generator 212 to reach the second shutter 213 is e, in addition to $t_2$, b, and c used in formulae (6) and (7). In this case, a time point $t_4$ at which the second shutter 213 is opened is expressed by formula (8). Since the photons travel at the speed of light, the time e can be calculated from the distances between the members.

$$t_2+b+c<t_4<t_2+b+c+e \qquad (8)$$

The reception detector 216 detects the photons s having passed through the second polarizer 214 and records whether the photons s are detected or not in the reception controller 219 (step S206). Thereafter, the reception controller 219 opens the first shutter 218 and closes the second shutter 213 (step S207).

Lastly, the reception controller 219 determines the transmitted information by using a result measured by the reception detector 216 (step S208). Specifically, when the photons are detected by the reception detector 216, the photons s before entering the second polarizer 214 are horizontally-polarized photons, and the other photons p are therefore vertically-polarized photons. From this, it is found that the first polarizer 221 on the optical path of the photons p is in the first state in which the vertically-polarized photons are allowed to completely pass. Hence, the reception controller 219 determines that the information transmitted from the transmitter 220 is "1" which is the first information. Meanwhile, when no photons are detected by the reception detector 216, the photons s before entering the second polarizer 214 are not the horizontally-polarized photons, and the other photons p are therefore the horizontally-polarized photons. From this, it is found that the first polarizer 221 on the optical path of the photons p is in the second state in which the direction to allow the photons to pass is rotated by the predetermined angle from that of the first state. Hence, the reception controller 219 determines that the information transmitted from the transmitter 220 is "0" which is the second information.

The optical communication system 200 in the embodiment has effects of the first embodiment and can also transmit one piece of information by performing transmission once. Accordingly, the optical communication system 200 can further increase the transmission speed.

The present invention is not limited to the embodiments described above, and appropriate changes can be made within a scope not departing from the purport of the present invention.

In this description, the present invention is described by using words such as vertical polarization, horizontal polarization, and diagonal polarization as the polarization of photons. However, the polarization in the present invention is not limited to polarization of specific directions. In the case of carrying out the present invention, polarization of other directions may be used based on the symmetry of polarization. In the case of using the polarization of other directions, the statements of the description may be replaced as appropriate.

The invention claimed is:

1. An optical communication system comprising:
    a photon pair generator which generates a correlated photon pair;
    a polarizer which is provided on an optical path of one photon of the correlated photon pair and direction of which is changeable based on information to be transmitted;
    a shutter which is provided between the photon pair generator and the polarizer on the optical path of the one photon of the correlated photon pair and which is capable of blocking the one photon of the correlated photon pair, the shutter being configured to block the one photon of the correlated photon pair after the correlated photon pair is generated and before the one photon of the correlated photon pair reaches the shutter; and
    a photon detector which is provided on an optical path of another photon of the correlated photon pair.

2. The optical communication system according to claim 1, wherein the photon pair generator is configured to generate the correlated photon pair after the direction of the polarizer is changed based on the information.

3. The optical communication system according to claim 1, comprising:
    a transmitter which includes the polarizer; and
    a receiver which includes the photon pair generator, the shutter, and the photon detector.

4. The optical communication system according to claim 3, wherein the shutter is configured to block the one photon of the correlated photon pair before the one photon of the correlated photon pair exits the receiver.

5. The optical communication system according to claim 1, further comprising:
    a quarter wave plate and a double slit plate which are provided between the photon pair generator and the photon detector on the optical path of the another photon of the correlated photon pair; and
    a controller which determines the information based on whether interference occurs or not when the another photon of the correlated photon pair passes the quarter wave plate and the double slit plate.

6. The optical communication system according to claim 1, further comprising:
    a second polarizer which is provided between the photon pair generator and the photon detector on the optical path of the another photon of the correlated photon pair; and
    a controller which determines the information based on whether the another photon of the correlated photon pair passes the second polarizer.

7. An optical communication method comprising:
    setting a direction of a polarizer based on information to be transmitted;
    generating a correlated photon pair with a photon pair generator after the direction of the polarizer is set;
    blocking one photon of the correlated photon pair with a shutter after the correlated photon pair is generated and before the one photon of the correlated photon pair reaches the shutter; and
    detecting another photon of the correlated photon pair with a detector after the correlated photon pair is generated, wherein the shutter and the polarizer are arranged on an optical path of the one photon of the correlated photon pair, and the detector is arranged on an optical path of the another photon of the correlated photon pair.

8. An optical communication system comprising:

a photon pair generator which generates a correlated photon pair;

a polarizer which is provided on an optical path of one photon of the correlated photon pair and direction of which is changeable based on information to be transmitted;

a shutter which is provided between the photon pair generator and the polarizer on the optical path of the one photon of the correlated photon pair and which is capable of blocking the one photon of the correlated photon pair;

a photon detector which is provided on an optical path of another photon of the correlated photon pair;

a transmitter which includes the polarizer; and a receiver which includes the photon pair generator, the shutter, and the photon detector, wherein the shutter is configured to block the one photon of the correlated photon pair before the one photon of the correlated photon pair exits the receiver.

* * * * *